United States Patent [19]
Katou

[11] 3,898,485
[45] Aug. 5, 1975

[54] DC VOLTAGE REGENERATING TRANSFORMER COUPLING DEVICE

[75] Inventor: Kazuo Katou, Ibaraki-ken, Japan

[73] Assignee: Hitachi, Ltd., Japan

[22] Filed: May 14, 1974

[21] Appl. No.: 469,878

[30] Foreign Application Priority Data
May 16, 1973 Japan.............................. 48-53545
Aug. 20, 1973 Japan.............................. 48-92499

[52] U.S. Cl. .................... 307/282; 321/44; 321/49; 328/150
[51] Int. Cl. ..... H02m 7/46; H02m 7/52; H03k 3/26
[58] Field of Search ............ 307/282; 328/150, 151; 324/127; 321/44, 49

[56] References Cited
UNITED STATES PATENTS
3,026,486  3/1962  Pintell.............................. 321/49 X
3,588,692  6/1971  Koski.............................. 324/127 X
3,851,239  11/1974 Suzuki.............................. 321/44 X

*Primary Examiner*—Siegfried H. Grimm
*Attorney, Agent, or Firm*—Craig & Antonelli

[57] ABSTRACT

A high speed and highly accurate transformer coupler comprising a pulse transformer to the input winding of which a DC voltage source is connected in which when a DC voltage is needed to be regenerated, the output winding of the pulse transformer is supplied with such a pulse voltage as enabling the voltage induced on the input winding by the pulse voltage on the output winding to become higher than the DC voltage to generate on the output winding a voltage proportional to the DC voltage.

11 Claims, 13 Drawing Figures

DC VOLTAGE REGENERATING TRANSFORMER COUPLING DEVICE

The present invention relates to a transformer coupler for regenerating a DC voltage isolatedly from a DC voltage source.

The process input/output device for a controlling electronic computer utilizes a Multiplexer (Trade Mark) which performs a multiple scanning of various analog signal sources from a process system. In this case it is often desired that an analog signal is regenerated isolatedly therefrom as a signal proportional thereto.

The most common device for regnerating a DC voltage isolatedly from a DC voltage source is a transformer coupler utilizing a pulse transformer. Such a transformer coupler must satisfy the following conditions:

1. The regenerating speed is high, and
2. It is of a high accuracy.

In all of the conventional transformer couplers employing a pulse transformer, a voltage source is connected to the input winding of the pulse transformer through a switch. At the regeneration time the switch is made conductive for a predetermined period of time to enable the DC voltage source to excite the input winding of the pulse transformer so that a voltage proportional to the voltage of the DC voltage source is produced on the output winding of the pulse transformer. Thus, in all of the conventional transformer couplers the excitation of the pulse transformer is caused by the DC voltage source the voltage of which is to be regenerated. As a result, the conventional couplers are low in the operating speed owing to the insufficient excitation of the pulse transformer and low in the accuracy owing to the sag and ringing.

An object of the present invention is to provide a DC voltage regenerating transformer coupler capable of operating at a high speed.

Another object of the present invention is to provide a DC voltage regenerating transformer coupler of a high accuracy.

The feature of the present invention is that the voltage source for exciting the pulse transformer is not the DC voltage source the voltage of which is to be regenerated but another voltage source.

According to the present invention there is provided a transformer coupling device comprising a pulse transformer having at least an input winding and an output winding, a switch normally in the off-state connected to the input winding of the pulse transformer, and a DC voltage source connected to the input winding of the pulse transformer through the switch, whereby, when the DC voltage of the DC voltage source is to be regenerated, the output winding of the pulse transformer is supplied with such a pulse voltage as enabling the voltage induced on the input winding by the pulse voltage on the output winding to be sufficiently high to turn the switch temporarily on to generate on the output winding a voltage proportional to the DC voltage.

The above and other objects, features and advantages of the present invention will become more apparent from the following detailed description of the preferred embodiments of the present invention when taken in conjunction with the accompanying drawings, in which.

Figure 3:
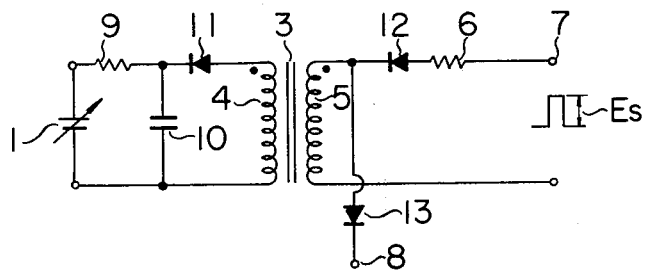
Figure 4:
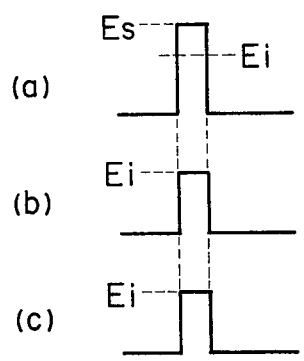
Figure 5:
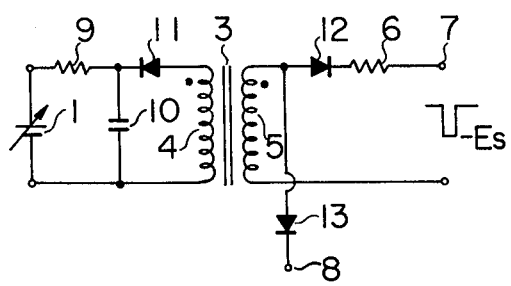
Figure 6:
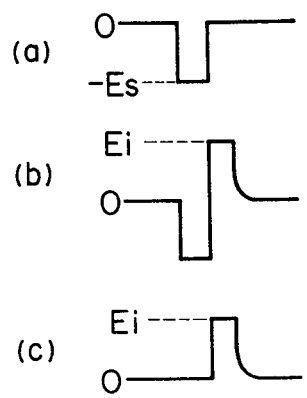

FIGS. 3, 5, and 7 to 13 are circuit diagrams of various embodiments of the present invention; and FIGS. 4 and 6 are characteristics of the embodiments of FIGS. 3 and 5, respectively.

Figure 1:
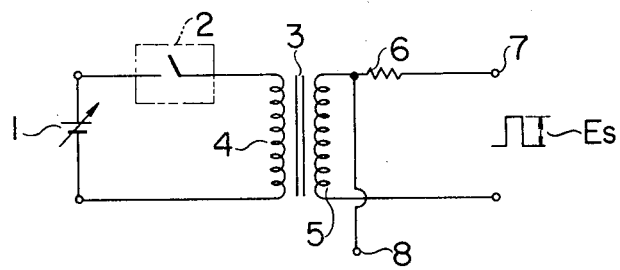
FIG. 1 is a schematic diagram illustrating the fundamental construction of the transformer coupler according to the present invention.

Referring to FIG. 1 reference numeral 1 designates the source of a DC voltage to be regenerated, reference numeral 2 designates an electrical switch, reference numeral 3 designates a pulse transformer having an input winding 4 and an output winding 5, reference numeral 6 designates a current limiting resistor, reference numeral 7 designates an input terminal for excitation, and reference numeral 8 designates an output terminal.

When the voltage $E_i$ of the DC voltage source 1 is desired to be regenerated on the output terminal 8 as a voltage proportional thereto, the input terminal 7 for excitation is supplied with such a pulse voltage $E_s$ for regeneration as making the voltage induced on the input winding 4 by the pulse voltage $E_s$ on the output winding 5 higher than the DC voltage $E_i$ to be regenerated. The switch 2, which will be described below referring to FIG. 3 and the subsequent figures, is such a one as normally in the off state and turns on if the voltage induced on the input winding 4 exceeds the DC voltage $E_i$. In the on-state of the switch 2 the maximum voltage induced on the input winding 4 is limited to the DC voltage $E_i$. If the turn ratio between the input winding 4 and the output winding 5 is 1 : 1, and if the maximum value of the induced voltage on the input winding 4 is equal to the voltage $E_i$, the output voltage on the output winding 5 is also limited to the value $E_i$. Consequently, the output voltage $E_o$ available at the output terminal 8 is of the value $E_i$, or in other words, the voltage $E_i$ of the DC voltage source 1 is isolatedly regenerated at the output 8.

If the voltage induced on the input winding 4 becomes lower than the DC voltage $E_i$ even slightly, the switch 2 comes to the off state at which time the magnetic flux of the pulse transformer 3 is reset to the zero level.

In this manner, in the arrangement of FIG. 1, at any desired time a pulse voltage $E_s$ higher than a predetermined value is supplied to the input terminal 7 for excitation to regenerate the DC voltage $E_i$ on the output terminal 8.

Thus, in the present invention, since the voltage source for exciting the pulse transformer is not the DC voltage source the voltage of which is to be regenerated, but another separately provided excitation source (not shown), the excitation is made by a voltage higher than the DC voltage to be regenerated, so that the excitation is sufficient, the rise is steep, the sag and ringing of the operation waveform are markedly reduced due to the limiter action, the regeneration is made high speed, and the accuracy is improved.

Figure 2:
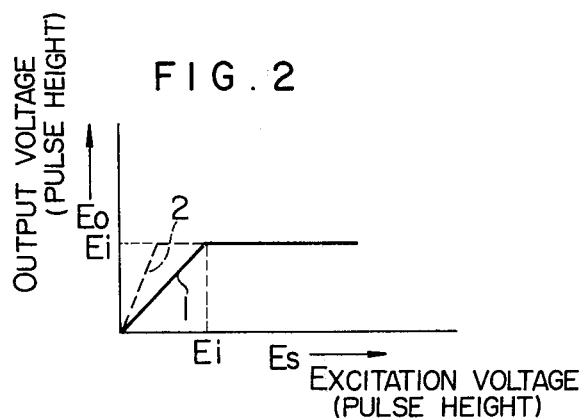
FIG. 2 is a graph for explaining the operation of the coupler of FIG. 1.

FIG. 2 shows the limiter action of the pulse transformer in FIG. 1. The solid line (1) is the relation between the pulse voltage $E_s$ and the output voltage $E_o$ when the voltage induced on the input winding 4 during the period of time of the application of the pulse voltage $E_s$ became higher than the DC voltage $E_i$ and the switch 2 turned on. Here, the turn ratio between the input winding 4 and the output winding 5 is assumed to be 1 : 1. However, if the turn ratio is assumed to be 1 : n, the output voltage $E_o$ becomes $E_o = (1/n)E_i$. The dotted line (2) is the relation between the pulse voltage $E_s$ and the output voltage $E_o$ when the switch 2 is made not to turn on during the period of time that the pulse voltage $E_s$ is supplied to the output winding 5 of the pulse transformer 3 but instead it is turned on by the fly-back voltage produced on the output winding 5 upon disappearance of the pulse voltage $E_s$.

An embodiment of the present invention which satisfies the characteristic (1) in FIG. 2 is shown in FIG. 3. A diode 11 corresponds to the switch 2 in FIG. 1 and is connected in the direction to block the DC voltage of the DC voltage source 1. The voltage $E_i$ of the DC voltage source 1 is always applied to a capacitor 10 for filtering through a resistor 9 so that the capacitor 10 is always charged with the voltage $E_i$. The polarities of the windings 4 and 5 of the pulse transformer 3 are as indicated by dots. Reference numerals 12 and 13 designate a reverse current blocking diode and a diode for compensating the voltage drop due to the diode 11, respectively.

In operation, when the pulse voltage $E_s$ is applied to the excitation input terminal 7, it is applied to the output winding 5 of the pulse transformer 3 through the resistor 6 and the diode 12 to induce a voltage on the input s4. When the voltage induced on the input winding 4 increases and exceeds the DC voltage $E_i$, the diode 11 becomes conductive. Thereafter, the voltage on the output winding 5 of the pulse transformer 3 is limited to the value of the voltage $E_i$ to produce on the output terminal 8 a pulse voltage the value of which is equal to the voltage of the voltage source 1 and the width of which is equal to that of the pulse voltage $E_s$ during the time period of continuation of the pulse voltage $E_s$.

Here, it is possible to compensate for the voltage drop due to the diode 11 by equalizing the voltage drops due to the diodes 11 and 13 to each other.

When the pulse voltage $E_s$ becomes zero, the magnetic flux of the pulse transformer 3 is immediately reset to the zero level since the diodes 11 and 12 both turn off.

According to the arrangement of FIG. 3 the isolation of the diode 11 which corresponds to the switch 2 in FIG. 1 is unnecessary and it is possible to fabricate a transformer coupler of a high speed and a high accuracy in spite of the simple circuit structure.

FIG. 4 shows the characteristics of the arrangement of FIG. 3. The pulse voltage waveform $E_s$ is shown at (a) in FIG. 4, the voltage waveform of the output winding 5 is shown at (b), and the voltage waveform at the output terminal 8 is shown at (c).

An embodiment of the present invention which satisfies the characteristic (2) in FIG. 2 is shown in FIG. 5. The difference of the arrangement of FIG. 5 from that of FIG. 3 is that the direction or polarity of the diode 12 is opposite and the pulse voltage to be applied to the exciting input terminal 7 is a negative pulse voltage. In the arrangement of FIG. 5, the characteristics of which are shown in FIG. 6, the voltage on the output winding 5 is negative while a negative pulse voltage is being applied. This negative voltage is blocked by the diode 13 so that the output voltage $E_o$ is zero. At this time the voltage induced on the input winding 4 is also negative and maintains the diode 11 in the off state. At the instant that the application of the pulse voltage is interrupted, a fly-back voltage is produced on the output winding 5 by the previously stored energy. The fly-back voltage induces a voltage on the input winding 4 in such a polarity that the diode 11 is turned on. Generally, the fly-back voltage is several times as high as the applied voltage so that is is possible to turn the diode 11 on easily. After the diode 11 is turned on, the voltage waveform on the output winding 5 is limited to the DC voltage $E_i$ similarly in the arrangement of FIG. 3. Consequently, when a fly-back voltage is utilized, the height or crest value of the pulse voltage for excitation is not necessarily required to be higher than the DC voltage of the DC voltage source 1.

In this case, the width of the output voltage available at the output terminal 8 has no direct connection with the pulse width of the pulse voltage for excitation, but it is determined by the energy stored in the output winding 5 during the application of the pulse voltage and the circuit constants.

Figure 7:
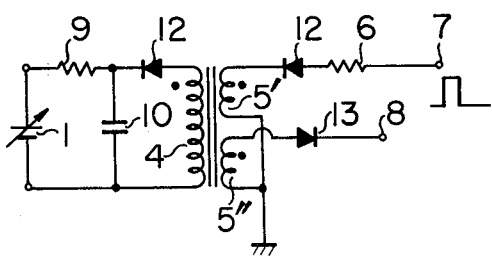

In the embodiment of FIG. 7 the windings of the pulse transformer 3 are made into three windings in contrast to the two windings of the pulse transformer 3 in FIGS. 1, 3, and 5, so that a read-out winding 5′ for excitation of the pulse transformer 3 and an output winding 5″ for deriving the output are provided separately. When the winding 5 in FIGS. 1, 3, and 5 is divided into two windings 5′ and 5″, the voltage drop of the winding 5′ due to the winding resistor does not affect the winding 5″ at the time of excitation of the pulse transformer 3, so that the regeneration of the DC voltage can be made with a higher accuracy that much.

Figure 8:
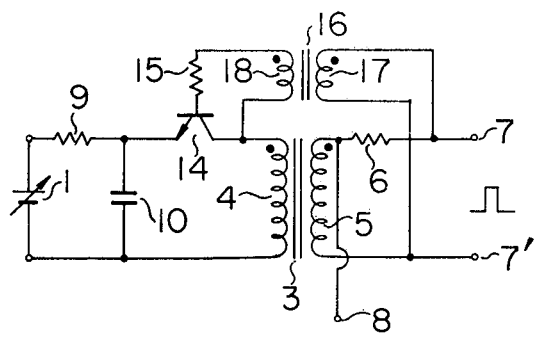

FIG. 8 is another embodiment of the present invention in which a transistor switch 14 is used as the switch 2 in FIG. 1. As illustrated the emitter of the transistor 14 is connected to the voltage source 1 side while the collector thereof is connected to the input winding 4 side so that the current from the DC voltage source 1 is blocked.

A pulse transformer 16 has an input winding 17 which is connected between the input terminals 7 and 7′ for excitation and an output winding 18 which is connected between the base and the collector of the transistor 14 through a resistor 15. Consequently, the pulse transformer 16 is driven synchronously with the pulse transformer 3 when a pulse voltage is applied to the exciting input terminal 7 and 7′ to turn the transistor 14 on by the output voltage of the output winding 18. In this case also, the condition of turning the transistor 14 on is that the voltage induced on the input winding 4 is higher than the voltage of the DC voltage source 1. In this case, the voltage on the output winding 5 of the pulse transformer 3 is limited to the voltage $E_i$ of the DC voltage source 1 and the regeneration of the DC voltage is made as described above.

According to the embodiment of FIG. 8 the voltage drop between the emitter and the collector of the transistor 14 is very low, about several hundreds of microvolts because the transistor 14 is turned on by the current flow from the base to the collector thereof. Consequently, the arrangement of FIG. 8 is suitable for the regeneration of the voltage of the DC voltage source 1 when it is of a low voltage.

Since it is sufficient for the pulse transformer 16 to be of such a capacity as only making the transistor 14 conductive, the pulse transformer 16 is about one tenth of the pulse transformer 3 in size.

For the drive of the transistor 14 such a pulse transformer 16 as shown in FIG. 8 is not necessarily required. The output of a part of the input winding 4 of the pulse transformer 3 may be utilized for driving the transistor 14.

Figure 9:
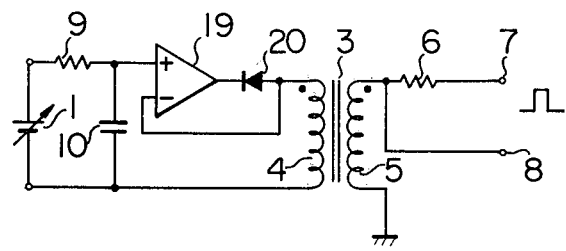

FIG. 9 is another embodiment of the present invention in which the voltage drop between the DC voltage source 1 and the input winding 4 of the pulse transformer 3, in particular the forward voltage drop of the diode is made very low. More particularly, as the diode 11 in FIG. 3 an ideal diode limiter circuit consisting of a high gain differential amplifier 19 and a diode 20 is provided. The DC voltage source 1 is connected to the positive input terminal of the differential amplifier 19 through the resistor 9, and the output terminal of the differential amplifier 19 is connected to the cathode of the diode 20, the anode of which is connected to one end of the input winding 4 of the pulse transformer 3. The anode of the diode 20 is also negatively fed back to the negative input terminal of the differential amplifier 19 so that the differential amplifier 19, the diode 20, and the negative feed-back loop compose an ideal diode limiter circuit.

Consider the case in which the polarity of the voltage $E_i$ of the DC voltage source 1 is as illustrated. When, in this state, the pulse voltage $E_s$ is not applied to the exciting input terminal 7, the voltage induced on the input winding 4 is zero. Consequently, no voltage is applied to the negative input terminal of the differential amplifier 19, while the positive input terminal thereof is supplied with the voltage $E_i$ of the DC voltage source 1 through the resistor 9 and the capacitor 10. As a result, the differential amplifier 19 sends out a positive maximum output and the diode 20 is blocked in the reversely biassed state. (If the output of the differential amplifier 19 is saturated, the restoration of the normal state is delayed. Consequently, practically it is used in the unsaturated state by separately feed back by a nonlinear resistor or the like.) It this time the output voltage $E_o$ is not produced on the output terminal 8.

If the pulse voltage $E_s$ is applied to the input terminal 7 when the DC voltage is desired to be regenerated, the voltage induced on the input winding 4 is negatively fed back to the differential amplifier 19. If the negatively fed back voltage exceeds the DC voltage $E_i$ even slightly, the output of the differential amplifier 19 changes in the negative direction to allow a current to flow through the diode 20 so that the pulse voltage induced on the input winding 4 becomes equal to the voltage $E_i$ supplied from the DC voltage source 1 to limit the rise of the pulse voltage. Hence, the voltage induced on the input winding 4 is surely limited to the DC voltage $E_i$. Then the voltage on the output winding 5 becomes also pulse voltage having the same amplitude to produce at the output terminal 8 a pulse voltage $E_o$ having the same amplitude as the voltage $E_i$ of the voltage source 1 in the isolated state.

In the above operation the input impedance of the differential amplifier 19 becomes very high irrespective of the operation level so that it receives substantially no current from the voltage source 1. This constitutes a factor for the highly accurate regeneration.

Since the forward voltage drop of the diode 20 is reduced to the value divided by the high open-loop gain of the differential amplifier 19, it becomes ordinarily a negligibly low value.

If the pulse transformer 3 is of about 100 mH and the driving current is several milliamperes or less, the accuracy of the embodiment of FIG. 9 can be made about 0.1 percent at a range of from 10 mV to 10 V of the DC voltage $E_i$.

Figure 10:
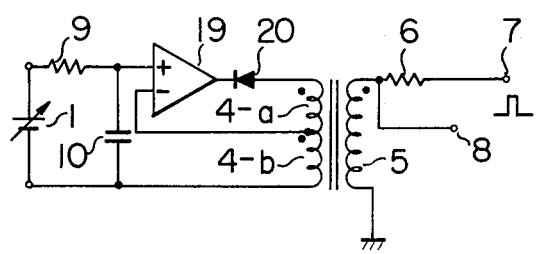
Figure 11:
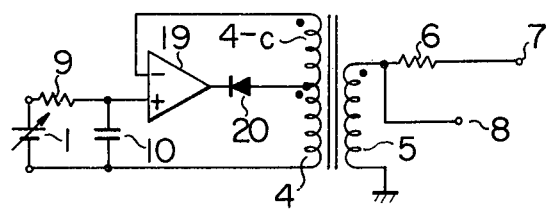

FIGS. 10 and 11 are modifications of the embodiment of FIG. 9. Though in FIG. 9 the negative feed back loop of the differential amplifier 19 starts from the anode of the diode 20, in FIG. 10 the negative feedback loop starts from the voltage-dividing winding 4-b of the input winding 4, and in FIG. 11 the negative feedback loop starts from one terminal of an additional winding 4-c provided to the input winding 4.

In FIG. 10, since the voltage induced on the voltage-dividing winding 4-a is limited by the DC voltage $E_i$, on the output terminal 8 a pulse voltage having an amplitude amplified to the value corresponding to the turn ratio between the voltage-dividing windings 4-a and 4-b of the input winding 4 is produced.

On the contrary, in FIG. 11, since a negative feedback is made from one end of the winding 4-c, the limited voltage of the output winding 5 can be brought to a value which is obtained by stepping down the DC voltage $E_i$.

Figure 12:
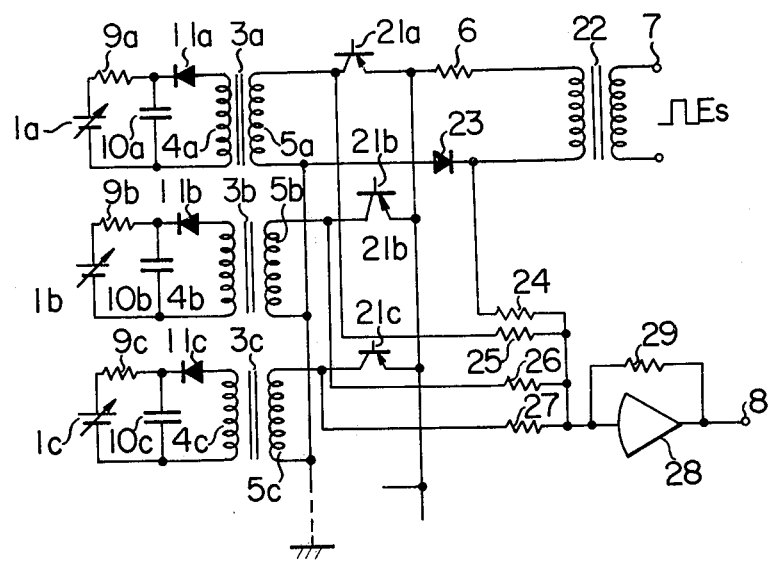

FIG. 12 is another embodiment in which the present invention is applied to an isolated type Multiplexer. DC voltage sources 1a to 1c to be measured are connected to the input windings 4a to 4c of the pulse transformers 3a to 3c through RC filters including resistors 9a to 9c and electrolytic capacitors 10a to 10c having a relatively large capacity and further through diodes 11a to 11c, respectively. The output windings 5a to 5c of the pulse transformers 3a to 3c, respectively, are connected to the output winding of a driving pulse transformer 22 through a series circuit of respective transistors 21a to 21c for selection, the common resistor 6, and a compensating diode 23. One end of each of the output winding 5a to 5c of the pulse transformers 3a to 3c is grounded and each output is derived from the output terminal 8 differentially by the use of an operational amplifier 28 through one end of the output winding and the cathode of the compensating diode 23.

Reference numeral 29 designates a feedback resistor of the operational amplifier 28 and reference numerals 24 to 27 designate input resistors.

The operation of the arrangement of FIG. 12 is as follows. For example, if the DC voltage of the DC voltage source 1b is to be measured, the corresponding transistor 21b is turned on (the driving circuit is not shown), when the pulse voltage $E_s$ is applied to the driving pulse transformer 22, to apply a pulse voltage to the corresponding pulse transformer 3b. When the voltage induced on the input winding 4b of the pulse transformer 3b has reached the voltsge of the DC voltage source 1b to be measured (more accurately, the voltage across the capacitor 10b), the diode 11b becomes conductive and the terminal voltage of the output winding 5b of the pulse transformer 3b is limited to the voltage of the DC voltage source 1b to be measured. Then, the difference between the terminal voltage of the output winding 5b and the voltage of the compensating diode 23 is derived as an output pulse from the output terminal 8.

Since, at this time, the currents flowing through the diode 11b and the compensating diode 23 are approximately equal, the influence of the voltage drop due to the diode 11b can be reduced to a certain extent by using diodes of the same characteristic.

It will be easily understood that by selecting the transistors 21a to 21c arbitrarily the voltage of the corresponding DC voltage source to be measured can be derived isolatedly.

Figure 13:
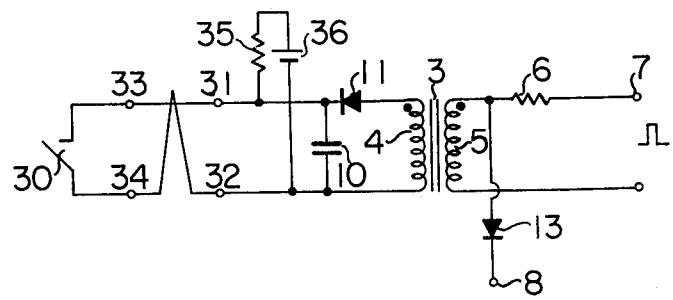

FIG. 13 is an application of the present invention to an isolated type digital signal input circuit which utilizes the on/off state signal of a contact as a digital signal source. Here, the characteristics of the wiring and the stray capacity are omitted. A mechanical switch 30, the signal source, is connected to both ends of a capacitor 10 correspondingly through the terminals 33 - 31, 34 - 32 of a pair of wiring conductors. Since there is no voltage source on the signal source side, a series circuit of a resistor 35 having a high resistance and a voltage source 36 is connected across the capacitor 10. If the switch 30 is in the off state as shown, a charging current flows into the capacitor 10 from the voltage source 36 through the resistor 35 having a high resistance so that the capacitor 10 is charged to a constant value determined by the voltage of the voltage source 36. On the contrary, if the switch 30 is in the on-state, the capacitor 10 is brought into the short circuited state so that it is discharged to the zero terminal voltage. Thus, the capacitor 10 always stores the voltage level corresponding to the on/off state of the switch 30.

The operation of regenerating the terminal voltage of the capacitor 10 on the output terminal 8 is similar in the arrangement of FIG. 3. By deriving the terminal voltage of the capacitor 10 from the output terminal 8 the on/off state of the switch 30 can be detected at a high speed. For example, the read-out at about 100 nsec. is possible.

The preferred embodiments and applications of the present invention have been described. The present invention can be utilized wherever a DC voltage is regenerated through a pulse transformer. According to the present invention the excitation energy of the pulse transformer is not derived from the signal source but from a separate voltage source. Moreover, the present invention takes advantage of the limiter function of the pulse transformer. Consequently, according to the present invention a high speed regeneration is possible with a high accuracy.

What is claimed is:

1. A transformer coupling device comprising a pulse transformer having at least an input winding and an output winding, an electrical switch normally in the off-state connected to the input winding of the pulse transformer, and a DC voltage source connected to the input winding of the pulse transformer through the switch, whereby, when the DC voltage of the DC voltage source is to be regenerated, the output winding of the pulse transformer is supplied with such a pulse voltage as enabling the voltage induced on the input winding by the pulse voltage on the output winding to be sufficiently high to turn the switch temporarily on to generate on the output winding a voltage proportional to the DC voltage.

2. A transformer coupling device according to claim 1, in which the value of the pulse voltage to be applied to the output winding is such that the voltage induced on the input winding by a fly-back voltage produced on the output winding when the application of the pulse voltage to the output winding is interrupted is higher than the DC voltage.

3. A transformer coupling device according to claim 1, in which said output winding consists of a first and a second winding, whereby when the DC voltage of the DC voltage source is to be regenerated, said first winding of the pulse transformer is supplied with such a pulse voltage as enabling the voltage induced on the input winding by the pulse voltage on the first winding to become higher than the DC voltage to produce on the second winding a voltage proportional to the DC voltage in the state of the switch turned on.

4. A transformer coupling device according to claim 1, in which the switch is a diode connected in the polarity to block the current from the DC voltage source.

5. A transformer coupling device according to claim 1, in which the switch is a transistor connected in the polarity to block the current from the DC voltage source.

6. A transformer coupling device according to claim 1, in which the switch is an ideal diode limiter circuit consisting of a differential amplifier circuit, a diode, and a negative feedback loop.

7. A transformer coupling device according to claim 6, in which the DC voltage source is connected to the positive input terminal of the differential amplifier circuit, the output terminal of the differential amplifier circuit is connected to the cathode of the diode, the anode of the diode is connected to one end of the input winding of the pulse transformer, and the anode of the diode is also connected to the negative input terminal of the differential amplifier circuit.

8. A transformer coupling device according to claim 6, in which the DC voltage source is connected to the positive input terminal of the differential amplifier circuit, the output terminal of the differential amplifier circuit is connected to the cathode of the diode, the anode of the diode is connected to one end of the input winding of the pulse transformer, and a part of the winding output of the input winding is connected to the negative input terminal of the differential amplifier circuit, the differential amplifier circuit being driven by such a pulse voltage as enabling the voltage of the negative input terminal of the differential amplifier circuit to become higher than the DC voltage.

9. A transformer coupling device according to claim 6, in which the DC voltage source is connected to the positive input terminal of the differential amplifier circuit, the output terminal of the differential amplifier circuit is connected to the cathode of the diode, the anode of the diode is connected to one end of the input winding of the pulse transformer, the pulse transformer further has a winding one end of which is connected to the anode of the diode and the other end of which is connected to the negative input terminal of the differential amplifier circuit, the pulse transformer being supplied with such a pulse voltage as enabling the voltage applied to the negative input terminal of the differential amplifier circuit to become higher than the DC voltage.

10. A transformer coupling device for use in an isolated type Multiplexer comprising a plurality of DC voltage sources to be measured, the same number of pulse transformers each having at least an input winding and an output winding, the same number of capacitors and diodes, each of the capacitors being connected in parallel with the corresponding input winding through the corresponding diode, the DC voltage of each of the DC voltage sources being applied across the corresponding capacitor in the polarity of blocking the corresponding diode, the output winding corresponding to the DC voltage source the voltage of which is required to be measured being supplied, when the measurement is to be made, with such pulse voltage as enabling the voltage induced on the corresponding input winding by the pulse voltage to become higher than the DC voltage to produce on the corresponding output winding an output voltage proportional to the DC voltage.

11. A transformer coupling device according to claim 1, comprising a capacitor and a resistor having a high resistance, the on/off state signal of the contact of a mechanical switch being used as a digital signal source, both ends of the contact being connected to both ends of the capacitor correspondingly, a series circuit of the resistor and the DC voltage source being connected to both ends of the capacitor, the capacitor being always supplied thereacross with a DC voltage corresponding to the on/off state of the contact.

* * * * *